(12) United States Patent
Doron et al.

(10) Patent No.: US 7,474,640 B2
(45) Date of Patent: Jan. 6, 2009

(54) SYSTEM, METHOD AND DEVICE OF INTERFERENCE MITIGATION IN WIRELESS COMMUNICATION

(75) Inventors: Ayelet Doron, Modi'in (IL); Yuval Lomnitz, Herzelia (IL)

(73) Assignee: Intel Corporation, Santa Clara, CA (US)

( * ) Notice: Subject to any disclaimer, the term of this patent is extended or adjusted under 35 U.S.C. 154(b) by 398 days.

(21) Appl. No.: 11/236,520

(22) Filed: Sep. 28, 2005

(65) Prior Publication Data

US 2007/0070932 A1 Mar. 29, 2007

(51) Int. Cl.
*H04Q 7/00* (2006.01)
(52) U.S. Cl. .................. 370/328; 370/333; 370/335; 455/67.13; 455/226.1
(58) Field of Classification Search ................ 370/328, 370/333, 335; 455/67.11, 226.1, 67.13
See application file for complete search history.

(56) References Cited

U.S. PATENT DOCUMENTS 5,619,524 A * 4/1997 Ling et al. ................. 375/130
2005/0135492 A1 6/2005 Ming et al.

OTHER PUBLICATIONS

International Search Report of Application No. PCT/US2006/037524 Issued on Apr. 23, 2007.

J-P Javaudin, J. Laine, D. Lacroix, O. Seller: "On Inter-Cell Interference in OFDMA Wireless Systems" 13. European Signal Processing Conference, [Online] Sep. 4, 2005, pp. 1-4, XP002416208, Antalya, Turkey.
Kettunen K et al.: "Iterative Multiuser Receiver Utilizing Soft Decoding Information" ICC '99. 1999 IEEE International Conference on Communications. Conference Record. Vancouver, CA, Jun. 6-10, 1999, IEEE International Conference on Communications, New York, NY: IEEE, US, pp. 942-946, XP000897997.
Ran Yaniv et al., "Symmetric UL/DL Diversity Permutations for OFDMA PHY", IEEE C802.16e-04/467r8, Jan. 27, 2005, pp. 1-29.
Jeremy Laine, "Interference Estimation in a Multicellular OFDMA Environment", Master Thesis, Jul. 2004, Radio Communication Systems Laboratory, Department of Signals, Sensors and Systems.

* cited by examiner

*Primary Examiner*—Temica M. Beamer
(74) *Attorney, Agent, or Firm*—Pearl Cohen Zedek Latzer, LLP

(57) ABSTRACT

Embodiments of the present invention provide a method, apparatus and system of interference mitigation in wireless communication. In some demonstrative embodiments the method may include determining one or more factors to be applied to one or more likelihood ratio values of one or more current symbols received by a station over one or more communication subcarriers, respectively, based on one or more sets of estimated error values, respectively, wherein the set of error values corresponds to a plurality of previous symbols received over the subcarrier. In some demonstrative embodiments the method may include determining the likelihood ratio value based on a probability that the current symbol includes interference caused by one or more other stations transmitting over the subcarrier. Other embodiments are described and claimed.

34 Claims, 2 Drawing Sheets

SYSTEM, METHOD AND DEVICE OF INTERFERENCE MITIGATION IN WIRELESS COMMUNICATION

BACKGROUND OF THE INVENTION

A wireless communication system may include a first station able to communicate with a second station over a communication channel.

The first station may include a receiver to receive a plurality of Orthogonal Frequency Division Multiple Access (OFDMA) symbols over a plurality of respective subcarriers of the communication channel corresponding to a signal transmitted by the second station.

The receiver may determine a plurality of metrics corresponding to the symbols received over the plurality of subcarriers, based on a plurality of respective sub-carrier channel estimations.

The receiver may determine an estimation of the signal transmitted by the second station based on the plurality of metrics.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
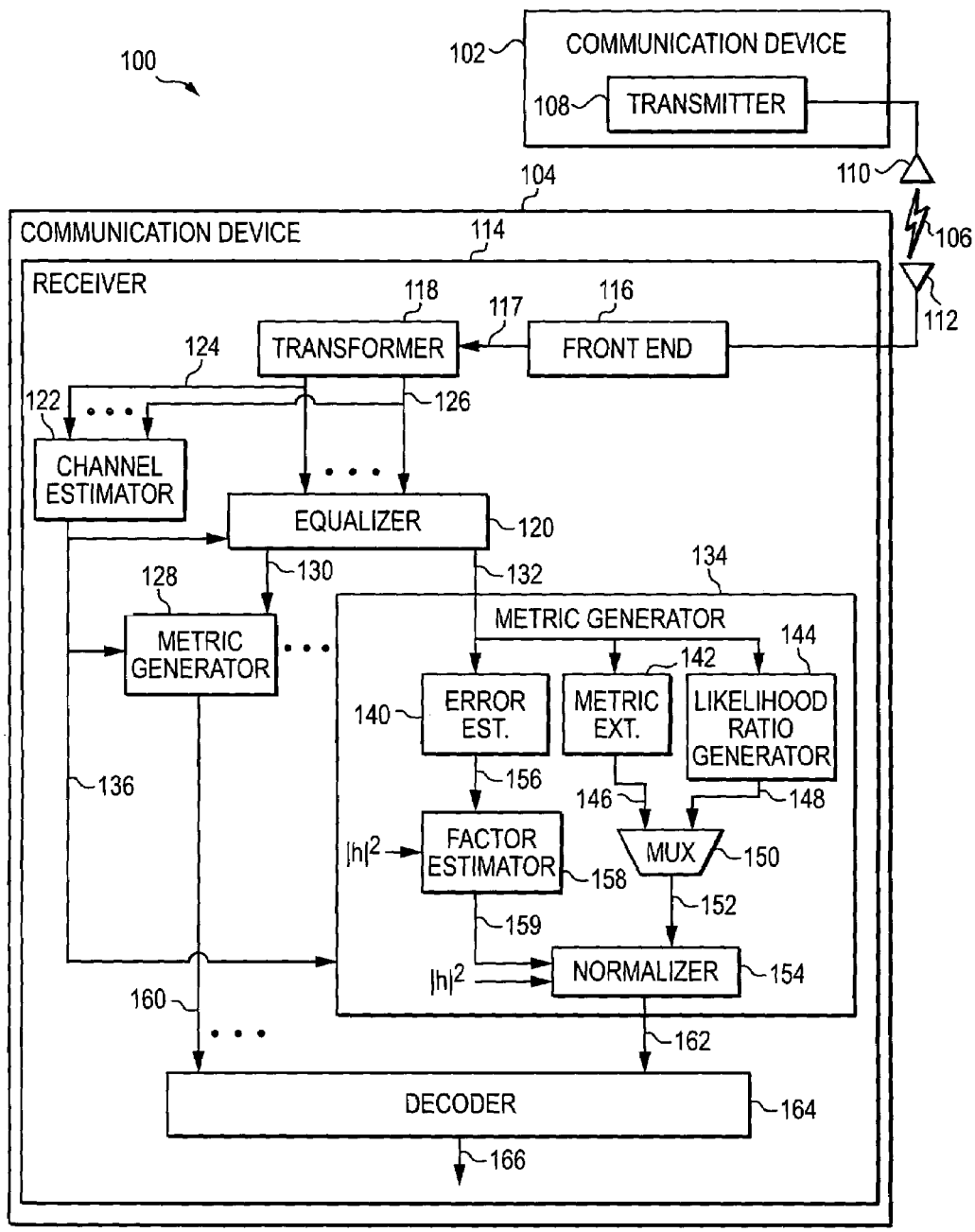
FIG. 1 is a schematic illustration of a wireless communication system in accordance with some demonstrative embodiments of the present invention.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits may not have been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

Some embodiments of the invention may be implemented, for example, using a machine-readable medium or article which may store an instruction or a set of instructions that, if executed by a machine (for example, by a processor and/or by other suitable machines), cause the machine to perform a method and/or operations in accordance with embodiments of the invention. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC; Pascal, Fortran, Cobol, assembly language, machine code, or the like.

It should be understood that the present invention may be used in a variety of applications. Although the present invention is not limited in this respect, the circuits and techniques disclosed herein may be used in many apparatuses such as units of a wireless communication system, for example, a Wireless Local Area Network (WLAN) system, a Wireless Metropolitan Area Network (WMAN) communication system, and/or in any other unit and/or device. Units of a communication system intended to be included within the scope of the present invention include, by way of example only, modems, Mobile Units (MU), Access Points (AP), wireless transmitters/receivers, and the like.

Types of WLAN and/or WMAN communication systems intended to be within the scope of the present invention include, although are not limited to, WLAN and/or WMAN communication systems as described by "IEEE-Std 802.16, 2004 Edition, Air Interface for Fixed Broadband Wireless Access Systems" standard ("the 802.16 standard"), and the like.

Although the scope of the present invention is not limited in this respect, the circuits and techniques disclosed herein may also be used in units of wireless communication systems, digital communication systems, satellite communication systems and the like.

Devices, systems and methods incorporating aspects of embodiments of the invention are also suitable for computer communication network applications, for example, intranet and Internet applications. Embodiments of the invention may be implemented in conjunction with hardware and/or software adapted to interact with a computer communication network, for example, a LAN, wide area network (WAN), or a global communication network, for example, the Internet.

Part of the discussion herein may relate, for exemplary purposes, to receiving a symbol over a subcarrier. However, embodiments of the invention are not limited in this regard, and may include, for example, receiving a signal, a block, a data portion, a packet, a data sequence, a frame, a data signal, a preamble, a signal field, a content, an item, a message, a protection frame, or the like.

Reference is made to FIG. 1, which schematically illustrates a wireless communication system 100 in accordance with an embodiment of the present invention.

According to some demonstrative embodiments of the invention, communication system 100 may include a WLAN/WMAN system. System 100 may include a first communication device 102 able to communicate with a second communication device 104 over a communication channel 106. For example, device 102 and/or device 104 may include a station, e.g., in accordance with the 802.16 standard.

According to some demonstrative embodiments of the invention, devices 102 and/or 104 may include one or more antennas 110 and 112, respectively, for transmitting and/or receiving symbols, e.g., over channel 106. Although the scope of the present invention is not limited in this respect, types of antennae that may be used for antennas 110 and/or 112 may include but are not limited to internal antenna, dipole antenna, omni-directional antenna, a monopole antenna, an end fed antenna, a circularly polarized antenna, a micro-strip antenna, a diversity antenna and the like.

Some demonstrative embodiments of the invention may relate to a Single Input Single Output (SISO) communication system including communication devices having a transmitter to handle transmissions using a single-antenna, and/or a receiver to handle transmissions received by a single antenna, e.g., as described below. However, it will be appreciated by those skilled in the art that in other embodiments of the invention the receiver and/or transmitter may be configured to handle multi-antenna transmissions.

According to some demonstrative embodiments of the invention, communication device 102 may include a transmitter 108 to transmit a time-domain signal including one or more Orthogonal Frequency Division Multiple Access (OFDMA) symbols modulated over one or more subcarriers, e.g., as is known in the art. For example, transmitter 108 may transmit a signal including a plurality of Quadrature Amplitude Modulation (QAM) symbols, e.g., 512 QAM symbols, modulated over a plurality of subcarriers, e.g., 512 subcarriers, respectively, as is known in the art. The QAM symbols may include, for example, 2-QAM symbols, Quadrature Phase Shift Key (QPSK) symbols, 8-QAM symbols, 16-QAM symbols, 64-QAM symbols, and/or any other suitable symbols, e.g., as are known in the art. Alternatively, transmitter 108 may generate the plurality of symbols using any other suitable modulation method, e.g., as is known in the art.

According to some demonstrative embodiments of the invention, communication device 102 may use a subcarrier permutation for communicating with device 104. The permutation may include, for example, a determined set of subcarriers, e.g., selected from a plurality of available subcarriers. Communication device 102 may use one or more other permutations for communicating with one or more other devices, e.g., as is known in the art.

According to some demonstrative embodiments of the invention, communication device 104 may include a receiver 114 to receive signals over channel 106. For example, receiver 114 may be able to receive a time-domain signal including symbols modulated over the subcarrier permutation of device 104. The received signal may correspond, for example, to the signal transmitted by transmitter 108.

According to some demonstrative embodiments of the invention, receiver 114 may include a front end 116 and a transformer 118, e.g., as are known in the art. Front end 116 may include any suitable front end module to convert the time-domain signal received from antenna 112 into a time-domain signal 117 of a format suitable for transformer 118, as known in the art. Transformer 118 transform signal 117 into a plurality of frequency-domain signals representing a plurality of received symbols, respectively. For example, transformer 118 may generate 512 signals, e.g., including signals 124 and 126. Transformer 118 may include, for example, a Fast Fourier Transformation (FFT) module, e.g., as is known in the art.

According to some demonstrative embodiments of the invention, receiver 114 may also include a channel estimator 122 to generate, based on the received symbols, a plurality of signals 136 representing a plurality of channel estimations of the plurality of subcarriers, respectively, e.g., as is known in the art.

According to some demonstrative embodiments of the invention, receiver 114 may also include an equalizer 120 to determine a plurality of equalized symbols, e.g., including symbols 130 and 132, corresponding to the plurality of received symbols, e.g., as is known in the art.

According to some demonstrative embodiments of the invention, receiver 114 may also include a plurality of metric generators, e.g., including generators 128 and 134, to determine a plurality of respective metrics, e.g., including metrics 160 and 162, based on the plurality of equalized symbols, respectively, as described in detail below. A metric generator of the plurality of generators, e.g., metric generator 134, may generate one or more metrics corresponding to an equalized symbol, e.g., symbol 132. The number of metrics generated by the metric generator may correspond, for example, to the number of bits per symbol of the equalized symbol. For example, metric generator 134 may generate two metrics, e.g., if symbol 132 includes a QPSK symbol represented by two bits; or four metrics, e.g., if symbol 132 includes a 16-QAM symbol represented by four bits.

According to some demonstrative embodiments of the invention, receiver 114 may also include a decoder 164 to decode the received signal, based on the plurality of metrics, and to generate a signal 166 representing an estimation of the signal transmitted by device 102. Decoder 164 may include any suitable decoder, e.g., a Viterbi decoder as is known in the art.

According to some embodiments, receiver 114 and/or transmitter 108 may be implemented, for example, using separate and/or integrated units, for example, using a transmitter-receiver or transceiver.

According to some demonstrative embodiments of the invention, one or more of the plurality of metric generators may include at least one likelihood ratio generator 144 to generate at least one likelihood ratio of a current symbol, denoted y, received by receiver 114. The symbol y may correspond to a symbol, denoted s, transmitted by transmitter 108, over a subcarrier ("the current subcarrier") of the subcarrier permutation of device 104. For example, likelihood ratio generator 144 may determine a likelihood ratio 148 corresponding to symbol 132. The number of likelihood ratios generated corresponding to symbol y may correspond, for example, to the number of bits per symbol of symbol y. For example, two likelihood ratios may be generated, e.g., if symbol 132 includes a QPSK symbol represented by two bits; or four likelihood ratios may be generated, e.g., if symbol 132 includes a 16-QAM symbol represented by four bits.

Some demonstrative embodiments of the invention may relate to a likelihood generator, e.g., generator 144, to generate a Log-Likelihood-Ratio (LLR) corresponding to the current symbol, as described in detail below. However, it will be appreciated by those skilled in the art that in other embodiments of the invention one or more of the plurality of likelihood ratio generators may generate any other suitable likelihood ratio.

In some demonstrative embodiments of the invention, generator 144 may generate likelihood ratio 148 based on a probability that the current symbol includes interference caused by one or more other stations transmitting over the current subcarrier, as described in detail below. It will be appreciated that the phrase "the probability that the current symbol includes the interference from the other stations" when used herein may refer to one or more probability functions, probability distributions, probability values, and/or any combination thereof corresponding to the probability that the current symbol includes the interference, e.g., as described below.

According to some demonstrative embodiments of the invention, the current symbol y may be represented as follows:

$$y = h \cdot s + \sum_{i=1}^{N_{INTR}} h_i \cdot g_i \cdot s_i + n \quad (1)$$

wherein h denotes a channel from transmitter 108 to receiver 114, e.g., as may be determined by channel estimator 122; $N_{INTR}$ denotes a number of other devices, transmitters and/or stations, which may interfere with the communication between the receiver and transmitter (hereinafter "interferers"); $h_i$ denotes a channel between an i-th interferer and receiver 114, i=1 ... $N_{INTR}$; $g_i$ denotes a gain of the i-th interferer; $s_i$ denotes a symbol transmitted by the i-th interferer; and n denotes a noise independent of the interferers, e.g., a thermal Gaussian noise having a variance denoted $\sigma_n^2$, as are all known in the art.

According to some demonstrative embodiments of the invention, the gain, $g_i$, may be represented as follows:

$$g_i = SIR_i^{-1/2} \cdot B_i \cdot hit_i \quad (2)$$

wherein $SIR_i$ denotes a signal to interference ratio corresponding to the i-th interferer; $B_i$ denotes a boosting value corresponding to the i-th interferer, i.e., a power enhancement provided by the i-th interferer to the sub-carrier, relative to a nominal power, e.g., as defined by the 802.16 standard; and $hit_i$ denotes a hit indicator having either a first value, denoted $h_1$, e.g., one, or a second value, denoted $h_2$, e.g., zero, indicating whether the i-th interferer has transmitted a symbol over the subcarrier or not, respectively.

Substituting Equation 2 in Equation 1 may yield the following representation of the current symbol:

$$y = h \cdot s + \sum_{i=1}^{N_{INTR}} h_i \cdot SIR_i^{-1/2} \cdot B_i \cdot hit_i \cdot s_i + n \quad (3)$$

The LLR value corresponding to the symbol y may be determined based on a ratio between a probability that the current symbol represents a first transmitted symbol value, denoted $s_0$, and a probability that the current symbol represents a second transmitted symbol value, denoted $s_1$. For example, in accordance with Equation 1, the LLR corresponding to the current symbol y may be determined as follows:

$$LLR = \log \left( \frac{Pr\left( \frac{\sum_{i=1}^{N_{INTR}} h_i \cdot g_i \cdot s_i + n}{h} = \frac{y}{h} - s | s = s_0 \right)}{Pr\left( \frac{\sum_{i=1}^{N_{INTR}} h_i \cdot g_i \cdot s_i + n}{h} = \frac{y}{h} - s | s = s_1 \right)} \right) \quad (4)$$

Some demonstrative embodiments of the invention, may relate to the symbol y having one of two predetermined possible symbol values, e.g., as described herein. However, it will be appreciated by those skilled in the art that other embodiments of the invention may relate to a received symbol having one of three or more possible symbol values. For example, in the 16-QAM, 64-QAM, or 8-PSK modulation methods, the symbols $s_0$ and $s_1$, may be replaced with groups of symbols in which a bit of interest equals 0 or 1, respectively, e.g., as is known in the art According to some demonstrative embodiments of the invention the probability that the symbol y represents a symbol value s', e.g., either $s_0$ or $s_1$, may be determined based on a combination of probability values of a plurality of interference cases and a respective plurality of probability distribution functions corresponding to the interference over the subcarrier in the plurality of interference cases, respectively, as described below.

According to some demonstrative embodiments of the invention, a plurality of l cases, denoted $Case_j$, j=1 ... l, may be defined corresponding to k interferers, wherein k≧1. The plurality of cases may represent, for example, a plurality of respective combinations of boost and/or hit indicator values corresponding to the k interferers. For example, if the cases are defined for k=2 interferers and the cases are defined only according to the hit indicator value, then four cases may be defined. A first case, $Case_1$, may represent a first interferer having a hit value $hit_1=h_1$, and a second interferer having a hit value $hit_2=h_1$; a second case, $Case_2$, may represent the first interferer having the hit value $hit_1=h_1$, and the second interferer having the hit value $hit_2=h_2$; a third case, $Case_3$, may represent the first interferer having the hit value $hit_1=h_2$, and the second interferer having the hit value $hit_2=h_1$; and a fourth case, $Case_4$, may represent the first interferer having the hit value $hit_1=h_2$, and the second interferer having the hit value $hit_2=h_2$.

The plurality of cases may be defined in any other suitable way, e.g., representing only the hit indicator values, only the boost values, a combination thereof, and/or any other suitable values. For example, the plurality of cases may be defined as follows:

$$\text{Case}_j = [B_1 = b_1(j), \text{hit}_1 = \text{hit}_1(j), B_2 = b_2(j), \text{hit}_2 = \text{hit}_2(j), \ldots, B_k = b_k(j), \text{hit}_k = \text{hit}_k(j)] \quad (5)$$

wherein $b_1(j)$, $b_2(j)$, and $b_k(j)$ denote the boost value of the k-th interferer in the j-th case, respectively; and hit1(j), hit2j, and hitk(j) denote the hit indicator value of the k-th interferer in the j-th case, respectively.

According to some demonstrative embodiments of the invention, a plurality of probabilities, denoted Pr(j), corresponding to the plurality of cases, respectively, may be determined, e.g., based on any suitable criteria For example, the probabilities Pr(j) may be determined, based on one or more characteristics of the interferers; and/or based on one or more simulations, and/or estimations of the communication system.

According to some demonstrative embodiments of the invention, a plurality of probability distribution functions, denoted PDF(j), may be determined corresponding to combinations of the noise n, and the interference resulting from the j cases. For example, the function PDF(j) may be determined as follows, e.g., assuming that the function PDF(j) has a Gaussian distribution with a zero expectation, and a carrier-to-interference-and-noise-ratio (CINR) variance, denoted $\sigma_{CINR}^2(j)$:

$$PDF(j) = \frac{1}{\sqrt{2\pi\sigma_{CINR}^2(j)}} \exp\left\{-\frac{1}{2\sigma_{CINR}^2(j)}\left(\frac{y}{h} - s\right)^2\right\} \quad (6)$$

wherein the variance $\sigma_{CINR}^2(j)$ may be determined as follows:

$$\sigma_{CINR}^2(j) = \frac{\sigma_n^2 + \sum_{i=1}^{N_{INTR}} |h_i \cdot B_i(j) \cdot hit_i(j) \cdot SIR_i^{-1}|^2}{|h|^2} \quad (7)$$

Thus, according to some demonstrative embodiments of the invention, the probability that the current symbol y represents a symbol value s' may be determined as follows:

$$Pr\left(\frac{\sum_{i=1}^{N_{INTR}} h_i \cdot g_i \cdot s_i + n}{h} = \frac{y}{h} - s | s = s'\right) = \sum_j Pr(j) \cdot PDF(j|s = s') \quad (8)$$

Substituting Equation 8 in Equation 4 may yield the following equation:

$$LLR = \log\left(\frac{\sum_j Pr(j) \cdot PDF(j|s = s_0)}{\sum_j Pr(j) \cdot PDF(j|s = s_1)}\right) \quad (9)$$

According to some demonstrative embodiments of the invention, generator 144 may determine likelihood ratio 148 based on the predetermined probabilities Pr(j) and the functions PDF(j) corresponding to the j cases, respectively, e.g., in accordance with Equation 9.

According to some demonstrative embodiments of the invention, generator 144 may determine likelihood ratio 148 based on a predetermined approximation function corresponding to Equation 9, e.g., as described below.

Figure 2:
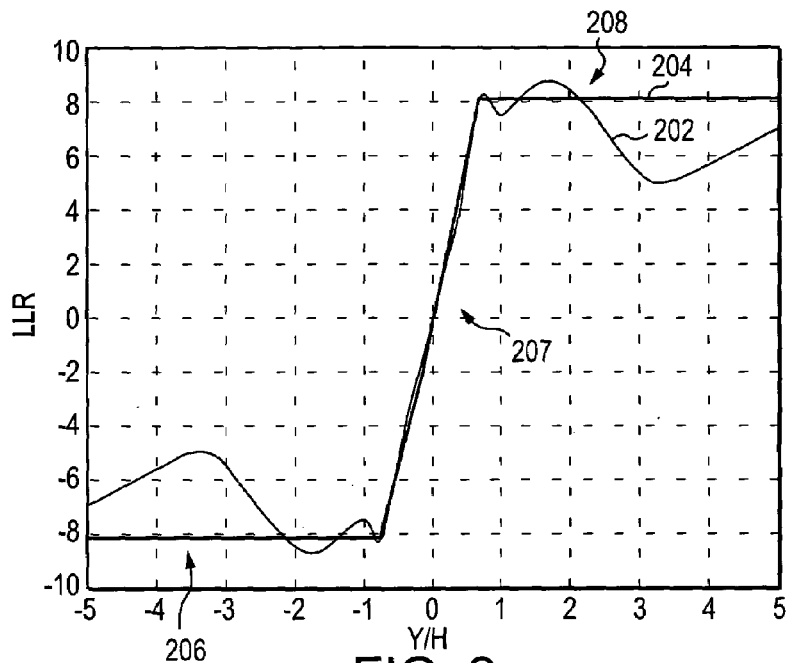
FIG. 2 is a schematic illustration of a first curve representing Log-Likelihood-Ratio (LLR) values versus equalized symbol values, and a second curve representing values of an approximation function versus the equalized symbol values, in accordance with one demonstrative embodiments of the invention.

Reference is also made to FIG. 2, which illustrates a first curve 202 representing LLR values determined based on Equation 9 versus equalized symbol values, denoted y/h; and a second curve 204 representing values of an approximation function, denoted F(y/h), versus the equalized symbol values, in accordance with some demonstrative embodiments of the invention.

The demonstrative embodiment of FIG. 2 may correspond to a Signal to Noise Ratio (SNR) of 20 dB; a SIR of 9 dB; an occurrence of a hit at a constant probability of 1/3; and boosting probabilities of Pr(B=-12 dB)=0; Pr(B=-9 dB)=0.056, Pr(B=-6 dB)=0.186, Pr(B=-3 dB)=0.2584, Pr(B=0 dB)=0.3444, Pr(B=3 dB)=0.1548, Pr(B=6 dB)=0.0003, and Pr(B=9 dB)=0.0001.

As shown in FIG. 2, the LLR values of curve 202 may be relatively close to the values of curve 204. Accordingly, in some demonstrative embodiments of the invention, the function F may be implemented for approximating the LLR values of curve 202.

According to some demonstrative embodiments of the invention, the approximation function F may include, a piecewise linear function including one or more linear portions. For example, the approximation function F may be defined as follows:

$$F^z(y/h) = c_1^z + c_2^z * y/h \text{ for } y_1^z \leq y/h < y_2^z \quad (10)$$

wherein $F^z(y/h)$ denotes a linear function of y/h corresponding to a z-th linear portion, $z \geq 1$; the values $c_1^z$, $c_2^z$, $y_1^z$ and/or $y_2^z$ may be determined based on LLR values, which may be determined by substituting one or more predetermined values in Equation 9, e.g., based on any suitable criteria. For example, curve 204 may include three linear portions, namely a first portion 206, wherein $F^1(y/h) = c_1^1 \approx (-8)$; a second portion 207, wherein $F^2(y/h) = c_1^2 + c_2^2 * y/h$, $c_1^2 = 0$, $c_2^2 \approx 8*\sqrt{2}$, and the values $y_1^2$ and/or $y_2^2$ may be determined based on the values $s_0$ and $s_1$, e.g., $y_1^2 = -1/\sqrt{2}$ and $y_2^2 = 1/\sqrt{2}$; and a third portion, wherein $F^3(y/h) = c_1^3 \approx 8$.

It will be appreciated by those skilled in the art that in other embodiments of the invention, any other suitable approximation function may be implemented by generator 144 for determining likelihood ratio 148.

Still referring to FIG. 1, according to some demonstrative embodiments of the invention metric generator 134 may include at least one metric extractor 142, e.g., in addition to or instead of likelihood ratio generator 144. Extractor 142 may generate a LLR value 146 based on the equalized symbol. For example, extractor 142 may include a slicer, e.g., as is known in the art.

According to some demonstrative embodiments of the invention, metric generator 134 may also include a selector, e.g., a multiplexer 150, for example, if metric generator 134 includes both likelihood ratio generator 144 and extractor 142. Multiplexer 150 may select between values 146 and 148 and provide a selected ratio 152 corresponding to either one of values 146 and 148, e.g., based on any desired criteria.

According to some demonstrative embodiments of the invention, the plurality of metric generators of receiver 114 may determine, e.g., as described above, a plurality of likelihood ratios, e.g., including ratio 152, corresponding to the plurality of current symbols, e.g., including symbol 132.

According to some demonstrative embodiments of the invention, a plurality of factors, denoted f, may be applied to the plurality of ratios, respectively, e.g., in order to determine the plurality of metrics, e.g., including metrics 160 and 162, respectively.

According to some demonstrative embodiments of the invention, the plurality of factors f may be determined based on a plurality of sets of estimated error values, respectively. A set of estimated error values corresponding to a subcarrier may be based, for example, on a plurality of previous symbols received over the subcarrier, as described in detail below.

According to some demonstrative embodiments of the invention, metric generator 134 may also include a normalizer 154 to determine metric 162 based on ratio 152 and the factor f corresponding to symbol 132. For example, normalizer 154 may determine metric 162 based on a product of ratio 152 and the factor f, e.g., as described below.

According to some demonstrative embodiments of the invention the factor f corresponding to the subcarrier may be determined as follows:

$$f = \frac{|h|^2}{\sigma^2} \quad (11)$$

wherein $\sigma^2$ denotes a variance of a combination of one or more of the noise n and the interference caused by the interferers over the subcarrier.

The factor f may be determined based on the boost and hit values, $B_i$ and $hit_i$, respectively, as well as the interfering channels $h_i$, e.g., as follows:

$$f = \frac{|h|^2}{\sigma_n^2 + \sum_{i=1}^{N_{INTR}} |h_i \cdot SIR_i^{-1} \cdot B_i \cdot hit_i|^2} \quad (12)$$

Determining the factor f based on the boost and hit values, as well as the interfering channels, e.g., according to Equation 12, may result in an improved mitigation of the interference, which may result in a relatively high improvement in the performance, e.g., in terms of bit/packet error probability, of receiver 114 in the presence of interference. However, determining the factor f according to Equation 12 may be relatively complicated It may be assumed that the interference caused by the interferers is relatively small compared to the noise n. Thus, for example, the factor f may be determined using only the noise variance $\sigma_n^2$, e.g., as follows:

$$f = \frac{|h|^2}{\sigma_n^2} \quad (13)$$

Since the variance $\sigma_n^2$ may be independent of the symbols received by the different metric generators of receiver 114, normalizer 154 may determine metric 162 based only on the estimation of the channel h, which may be received from estimator 122. For example, normalizer 154 may determine metric 162 as follows:

$$M=|h|^2*R(y/h)*Const \quad (14)$$

wherein M denotes metric 162, R (y/h) denotes ratio 152 corresponding to the symbol y/h, and Const denotes any suitable constant value However, determining the factor f based only on the noise n may result in a relatively small improvement in the interference mitigation of receiver 114, e.g., as described below with reference to FIG. 3.

Alternatively, the factor f may be determined based on the noise n, as well as the interfering channels $h_i$, e.g., as follows:

$$f = \frac{|h|^2}{\sigma_n^2 + \sum_{i=1}^{N_{INTR}} |h_i \cdot SIR_i^{-1}|^2} \quad (15)$$

In another alternative, the factor f may be determined based on the noise n, as well as the boost and hit values, $B_i$ and $hit_i$, respectively, e.g., as follows:

$$f = \frac{|h|^2}{\sigma_n^2 + \sum_{i=1}^{N_{INTR}} |SIR_i^{-1} \cdot B_i \cdot hit_i|^2} \quad (16)$$

According to some demonstrative embodiments of the invention, it may be advantageous to determine the factor f based on the boost and hit values of the interferers, e.g., in accordance with Equation 16. As described below, determining the factor f, based on the boost and hit values, e.g., while not considering the channels $h_i$ of the interferers, may result in a substantial improvement in the interference mitigation of receiver 114, e.g., compared to interference mitigation when determining the factor f based on Equations 13 or 15. Furthermore, the difference between the interference mitigation achieved based on Equations 16 and 12, respectively, may be relatively small.

According to some demonstrative embodiments of the invention, it may be assumed that:

$$\text{mean}_T(|h_i|^2) \approx 1 \quad (17)$$

wherein $\text{mean}_T(|h_i|^2)$ denotes an average of the interfering channels $h_i$ over a time period, T, e.g., as described below.

According to some demonstrative embodiments of the invention, the time period T may include a time period longer than a coherence time period corresponding to the channel h. The coherence time period may represent, for example, a time period during which the response of the channel h may be considered substantially stable, e.g., unchanged. For example, the coherence time of the channel h may be defined as a time lag during which the channel response autocorrelation coefficient reduces to 0.7, e.g., as is known in the art.

The coherence time corresponding to a channel, e.g., the channel h, between a transmitter and a receiver may relate, for example, to a relative velocity between the receiver and the transmitter. For example, the higher the relative velocity between the receiver and the transmitter, the smaller the time coherence may be. Thus, in some demonstrative embodiments of the invention, the time period T may be determined based on a relative velocity between devices 102 and 104 (FIG. 1).

Thus, according to some demonstrative embodiments of the invention, the variance $\sigma^2$ corresponding to the noise n, as well as the hit and boost values over the current subcarrier, may be determined based on an average of a set of error values corresponding to symbols previously received over the current subcarrier during time period T, e.g., as follows:

$$\sigma^2 \cong \sigma_n^2 + \sum_{i=1}^{N_{INTR}} |SIR_i^{-1} \cdot B_i \cdot hit_i|^2 \cong \frac{\sum_{q=1}^{p} Error^2(q)}{p} \quad (18)$$

wherein p denotes a number of symbols received over the current subcarrier during time period T; and Error(q) denotes an estimated error corresponding to the q-th symbol, q=1 ... p. Any other suitable method of estimating the variance $\sigma^2$ corresponding to the noise n, as well as the hit and boost values over the current subcarrier, may be used.

According to some demonstrative embodiments of the invention, metric generator 134 may include an error estimator 140 to estimate the error Error(q) of symbols received over the current subcarrier. For example, estimator 140 may generate a signal 156 corresponding to the value of Error(q). Estimator 140 may include any suitable error estimator, e.g., as is known in the art. For example, estimator 140 may estimate the value Error(q) based on a difference between the symbols and an estimation of the transmitted symbol.

According to some demonstrative embodiments of the invention, metric generator 134 may also include a factor estimator 158 to receive from error estimator the plurality of estimated errors, Error(q), corresponding to the plurality of previously received symbols; and to determine the variance $\sigma^2$ based on the plurality of estimated errors, e.g., according to Equation 18.

In some demonstrative embodiments, factor estimator 158 may also generate a signal 159 corresponding to the factor f, e.g., according to Equation 11, based on the determined variance $\sigma^2$ of Equation 18. For example, factor estimator 158 may receive the estimated channel h from channel estimator 122.

In other demonstrative embodiments of the invention, factor estimator 158 may generate signal 159 corresponding to any other value, e.g., the value of $1/\sigma^2$. In these embodiments, normalizer 154 may determine normalized metric 162, for example, based on the value of signal 159, and the estimated channel h.

In some demonstrative embodiments of the invention, one or more other metric generators of receiver 114, e.g., metric generator 128, may include an error estimator (not shown), e.g., analogous to estimator 140; a likelihood ratio generator (not shown), e.g., analogous to generator 144; a metric extractor (not shown), e.g., analogous to extractor 142; a factor estimator (not shown), e.g., analogous to factor estimator 158; a normalizer (not shown), e.g., analogous to normalizer 154; and/or a selector (not shown), e.g., analogous to selector 150. Accordingly, receiver 114 may determine the plurality of factors f based on a plurality of sets of estimated error values, respectively.

According to some demonstrative embodiments of the invention, different metric generation methods may be implemented for determining the metrics to be provided to decoder 164, e.g., according to the attributes of different communication systems. Some of the metric generation methods may include determining the likelihood ratio values based on the probability that the current symbol includes interference, e.g., using Equation 9 and/or the approximation function F, as described above. Other metric generation methods may include determining the likelihood ratio values using a metric extractor, e.g., extractor 142, as described above. Additionally or alternatively, some of the metric generation methods may determined the factors f based on the estimated error sets, as described above, with reference to factor estimator 158.

Figure 3:
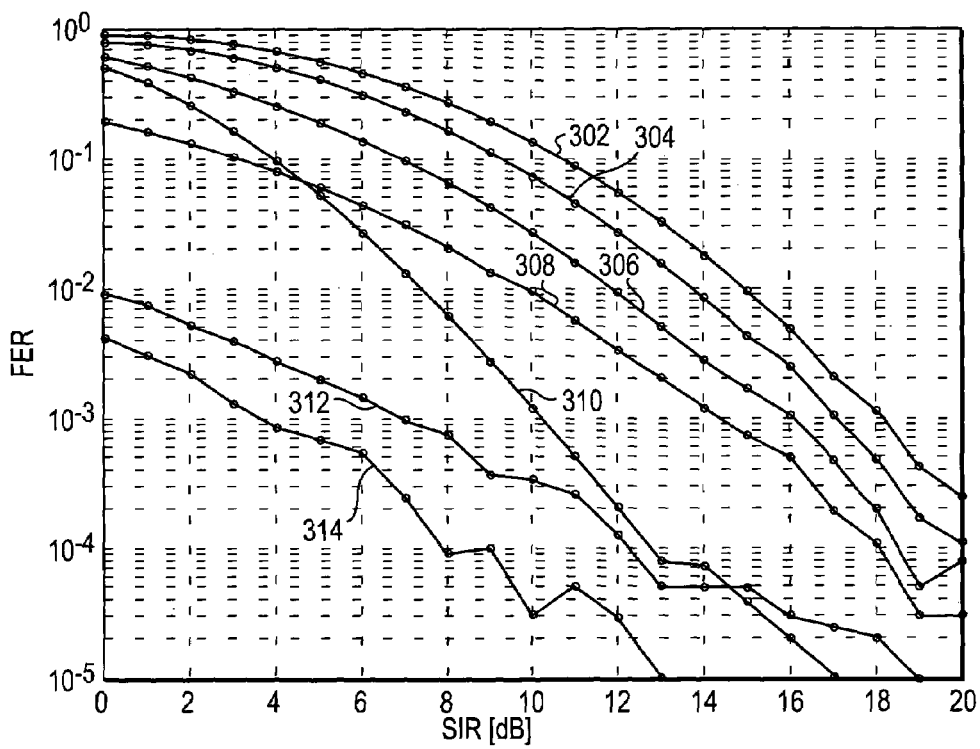
FIG. 3 is a schematic illustration of seven curves representing simulated Frame Error Rate (FER) values versus Signal to Interference Ratio (SIR), corresponding to seven respective metric generation methods, in accordance with some demonstrative embodiments of the invention.

Reference is made to FIG. 3, which schematically illustrates seven curves 302, 304, 306, 308, 310, 312, and 314, respectively, representing simulated Frame Error Rate (FER) values versus SIR, corresponding to seven respective metric generation methods, in accordance with some demonstrative embodiments of the invention.

Curve 302 represents FER values corresponding to metric values determined based on LLR values generated by extractor 142 (FIG. 1); and the factors f determined according to Equation 13. Curve 304 represents FER values corresponding to metric values determined based on LLR values generated by extractor 142 (FIG. 1); and the factors f determined according to Equation 15. Curve 306 represents FER values corresponding to metric values determined based on LLR values generated by likelihood ratio generator 144 (FIG. 1) implementing the approximation function F; and the factors f determined according to Equation 15. Curve 308 represents FER values corresponding to metric values determined based on LLR values generated by likelihood ratio generator 144 (FIG. 1) based on Equation 9; and the factors f determined according to Equation 15. Curve 310 represents FER values corresponding to metric values determined based only on the noise n. Curve 312 represents FER values corresponding to metric values determined based on LLR values generated by extractor 142 (FIG. 1); and the factors f determined according to Equation 16. Curve 314 represents FER values corresponding to metric values determined based on LLR values generated by extractor 142 (FIG. 1); and the factors f determined according to Equation 12.

As shown in FIG. 3, the FER values of curve 312 are significantly smaller than the FER values of curves 302 and 304. This may indicate the performance improvement achieved by determining the factors f based on the noise n, as well as the boost and hit values of the interferers, e.g., by determining the factors f based on the sets of estimated errors, may be substantially larger compared to the performance improvement achieved by determining the f factors based on Equations 13 or 15.

As further shown in FIG. 3, the FER values of curves 306 and 308 are smaller than the FER values of curve 302. This may indicate that using likelihood ratios based on Equation 9, may result in an improved interference mitigation, which may result in an improvement in the performance in the presence of the interference.

Embodiments of the present invention may be implemented by software, by hardware, or by any combination of software and/or hardware as may be suitable for specific applications or in accordance with specific design requirements. Embodiments of the present invention may include units and sub-units, which may be separate of each other or combined together, in whole or in part, and may be implemented using specific, multi-purpose or general processors, or devices as are known in the art. Some embodiments of the present invention may include buffers, registers, storage units and/or memory units, for temporary or long-term storage of data and/or in order to facilitate the operation of a specific embodiment.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

What is claimed is:

1. A method comprising:
   determining one or more factors to be applied to one or more likelihood ratio values of one or more current symbols received over one or more communication subcarriers, respectively, based on a plurality of boost and hit values and on one or more sets of estimated error values, wherein said set of error values corresponds to a plurality of previous symbols received over said subcarrier.

2. The method of claim 1, wherein determining said factor comprises determining a factor to be applied to a likelihood ratio corresponding to a ratio between a probability that said current symbol represents a first transmitted symbol value, and a probability that said current symbol represents a second transmitted symbol value.

3. The method of claim 1, wherein determining said factor comprises determining said factor based on said set of estimated error values corresponding to said plurality of previous symbols received during a time period longer than a coherence time of a channel of said subcarrier.

4. The method of claim 1, wherein the plurality of boost and hit values corresponds to a plurality of interferers over said subcarrier.

5. The method of claim 1, wherein determining said factor comprises determining said factor based on a channel estimation of said subcarrier.

6. The method of claim 1, wherein determining said one or more factors comprises determining a plurality of factors to be applied to a plurality of likelihood ratio values of a plurality of current symbols received over a plurality of communication subcarriers, respectively, said method comprising multiplying said plurality of likelihood ratio values by said plurality of factors, respectively, to generate a plurality of normalized ratio values.

7. The method of claim 1 comprising determining an average of two or more of said set of error values, wherein determining said factor comprises determining said factor based on said average.

8. The method of claim 1, wherein determining said factor comprises determining a factor corresponding to an estimated carrier-to-interference-and-noise-ratio of said current symbol.

9. An apparatus comprising:
   one or more factor estimators to determine one or more factors to be applied to one or more likelihood ratio values of one or more current symbols received over one or more communication subcarriers, respectively, based on a plurality of boost and hit values and on one or more sets of estimated error values, said set of error values corresponding to a plurality of previous symbols received over said subcarrier.

10. The apparatus of claim 9, wherein said likelihood ratio corresponds to a ratio between a probability that said current symbol represents a first transmitted symbol value, and a probability that said current symbol represents a second transmitted symbol value.

11. The apparatus of claim 9, wherein said set of estimated error values comprises error values corresponding to said plurality of previous symbols received during a time period longer than a coherence time of a channel of said subcarrier.

12. The apparatus of claim 9, wherein said plurality of boost and hit values corresponds to a plurality of interferers over said subcarrier.

13. The apparatus of claim 9, wherein said factor estimator is able to determine said factor based on a channel estimation of said subcarrier.

14. The apparatus of claim 9, wherein said one or more factor estimators comprise a plurality of factor estimators to determine a plurality of factors to be applied to a plurality of likelihood ratio values of a plurality of current symbols received over a plurality of communication subcarriers, respectively, said apparatus comprising a plurality of normalizers to generate a plurality of normalized values based on said plurality of likelihood ratio values and said plurality of factors, respectively.

15. The apparatus of claim 9, wherein said factor estimator is able to determine an average of two or more of said set of error values, and to determine said factor based on said average.

16. The apparatus of claim 9, wherein said factor corresponds to an estimated carrier-to-interference-and-noise-ratio of said current symbol.

17. A wireless transmission system comprising:
   a wireless station including:
      at least one dipole antenna to receive one or more current symbols over one or more communication subcarriers, respectively; and
      one or more factor estimators to determine one or more factors to be applied to one or more likelihood ratio value of said one or more current symbols, respectively, based on a plurality of boost and hit values and on one or more sets of estimated error values, said set of error values corresponding to a plurality of previous symbols received over said subcarrier.

18. The wireless transmission system of claim 17, wherein said set of estimated error values comprises error values corresponding to said plurality of previous symbols received during a time period longer than a coherence time of a channel of said subcarrier.

19. A method comprising:
   determining a likelihood ratio value of a current symbol received by a communication device over a communication subcarrier based on a plurality of boost and hit values and on a probability that said current symbol includes interference caused by one or more other communication devices transmitting over said subcarrier.

20. The method of claim 19, wherein determining said likelihood ratio value comprises determining a likelihood ratio value corresponding to a ratio between a probability that said current symbol represents a first transmitted symbol value, and a probability that said current symbol represents a second transmitted symbol value.

21. The method of claim 19, wherein determining said likelihood ratio value comprises determining said likelihood ratio value based on a combination of probabilities of a plurality of interference cases and a respective plurality of probability distribution functions corresponding to the interference over said subcarrier in said plurality of interference cases.

22. The method of claim 21, wherein said plurality of interference cases represent a plurality of respective combinations of interference values corresponding to said one or more other stations, said interference values comprising at least one of hit indicator values and boost values.

23. The method of claim 21, wherein one or more of said distribution functions comprise one or more Gaussian distribution functions having one or more variances corresponding to carrier-to-interference-and-noise-ratio variances of one or more of said plurality of cases, respectively.

24. The method of claim 21, wherein determining said likelihood ratio value comprises determining said likelihood ratio value based on a predetermined approximation function representing said combination.

25. The method of claim 24, wherein determining said likelihood ratio value based on said approximation function comprises determining said likelihood ratio value based on a piecewise linear function including one or more linear portions.

26. An apparatus comprising:
a generator to generate a likelihood ratio value of a current symbol received by a station over a communication subcarrier based on a plurality of boost and hit values and on a probability that said current symbol includes interference caused by one or more other stations transmitting over said subcarrier.

27. The apparatus of claim 26, wherein said likelihood ratio value comprises a likelihood ratio value corresponding to a ratio between a probability that said current symbol represents a first transmitted symbol value, and a probability that said current symbol represents a second transmitted symbol value.

28. The apparatus of claim 26, wherein said generator is able to determine said likelihood ratio value based on a combination of probabilities of a plurality of interference cases and a respective plurality of probability distribution functions corresponding to the interference over said subcarrier in said plurality of interference cases.

29. The apparatus of claim 28, wherein said plurality of interference cases represent a plurality of respective combinations of interference values corresponding to said one or more other stations, said interference values comprising at least one of hit indicator values and boost values.

30. The apparatus of claim 28, wherein one or more of said distribution functions comprise one or more Gaussian distribution functions having one or more variances corresponding to carrier-to-interference-and-noise-ratio variances of one or more of said plurality of cases, respectively.

31. The apparatus of claim 28, wherein said generator is able to determine said likelihood ratio value based on a predetermined approximation function representing said combination.

32. The apparatus of claim 31, wherein said approximation function comprises a piecewise linear function including one or more linear portions.

33. A wireless transmission system comprising:
a wireless station including:
at least one dipole antenna to receive a current symbol over a communication subcarrier; and
a generator to generate a likelihood ratio value of said current symbol based on a plurality of boost and hit values and on a probability that said current symbol includes interference caused by one or more other stations transmitting over said subcarrier.

34. The wireless transmission system of claim 33, wherein said generator is able to determine said likelihood ratio value based on a combination of probabilities of a plurality of interference cases and a respective plurality of probability distribution functions corresponding to the interference over said subcarrier in said plurality of interference cases.

* * * * *